United States Patent
Ganesan et al.

(10) Patent No.: US 8,862,918 B2
(45) Date of Patent: Oct. 14, 2014

(54) EFFICIENT FREQUENCY BOOST OPERATION

(75) Inventors: Baskaran Ganesan, Bangalore (IN); James S. Burns, Cupertino, CA (US); Suresh Sugumar, Bangalore (IN); Devadatta V. Bodas, Federal Way, WA (US); Sundaravarathan R. Iyengar, Federal Way, WA (US); Feranak Nelson, Olympia, WA (US); Dheemanth Nagaraj, Bangalore (IN); Russell J. Fenger, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 13/174,958

(22) Filed: Jul. 1, 2011

(65) Prior Publication Data

US 2013/0007475 A1 Jan. 3, 2013

(51) Int. Cl.
*G06F 1/32* (2006.01)
*G06F 1/08* (2006.01)

(52) U.S. Cl.
CPC . *G06F 1/324* (2013.01); *G06F 1/08* (2013.01)
USPC ........................... 713/322; 713/300; 713/320

(58) Field of Classification Search
CPC ............. G06F 1/02; G06F 1/022; G06F 1/04; G06F 1/08; G06F 1/3206; G06F 11/34; G06F 11/3409; G06F 11/3442
See application file for complete search history.

(56) References Cited

U.S. PATENT DOCUMENTS

| 7,526,661 | B2 | 4/2009 | Nakajima et al. | |
| 7,818,596 | B2 | 10/2010 | Fenger et al. | |
| 2007/0061603 | A1 | 3/2007 | Cox et al. | |
| 2008/0148027 | A1* | 6/2008 | Fenger et al. | 712/229 |
| 2008/0278136 | A1 | 11/2008 | Murtojarvi | |
| 2011/0047401 | A1* | 2/2011 | Werner | 713/500 |
| 2011/0138388 | A1* | 6/2011 | Wells et al. | 718/100 |
| 2012/0023345 | A1* | 1/2012 | Naffziger et al. | 713/320 |
| 2012/0130680 | A1* | 5/2012 | Zink et al. | 702/186 |

FOREIGN PATENT DOCUMENTS

| WO | 2013/006511 A2 | 1/2013 |
| WO | 2013/006511 A3 | 3/2013 |

OTHER PUBLICATIONS

International Search Report and Written Opinion received for PCT application Na PCT/US2012/045154, mailed on Jan. 23, 2013, 9 pages.
International Preliminary Report on Patentability received for PCT Patent Application No. PCT/US2012/045154, mailed on Jan. 16, 2014, 6 pages

* cited by examiner

*Primary Examiner* — Dennis M Butler
(74) *Attorney, Agent, or Firm* — Jordan IP Law, LLC

(57) ABSTRACT

Systems and methods of operating a computing system may involve identifying a plurality of state values, wherein each state value corresponds to a computing thread associated with a processor. An average value can be determined for the plurality of state values, wherein a determination may be made as to whether to grant a frequency boost request based at least in part on the average value.

27 Claims, 4 Drawing Sheets

EFFICIENT FREQUENCY BOOST OPERATION

BACKGROUND

1. Technical Field

Embodiments generally relate to frequency boost operations in computing platforms. More particularly, embodiments relate to the averaging of performance state and/or power state values to enhance the efficiency of frequency boosts.

2. Discussion

Certain computing platforms may provide improved performance by boosting processor core frequencies beyond the advertised frequency value (e.g., "turbo" boosting) so that available power and thermal head-room is used. While the turbo boost might increase performance, it can also reduce energy efficiency in certain circumstances. For example, known turbo boost approaches may exhibit significant efficiency degradations during loads ranging from approximately 60% to 80%, particularly in multi-core, multi-threaded architectures.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a computer readable storage medium having a set of instructions which, if executed by a processor, cause a computer to identify a plurality of state values, wherein each state value is to correspond to a computing thread. The instructions may also cause a computer to determine an average value for the plurality of state values, and determine whether to grant a frequency boost request based at least in part on the average value.

Embodiments can also involve a computer implemented method in which a plurality of state values are identified, wherein each state value corresponds to a computing thread. The method may also provide for determining an average value for the plurality of state values, and determining whether to grant a frequency boost request based at least in part on the average value.

In addition, embodiments may include a system having a processor and logic to identify a plurality of state values, wherein each state value is to correspond to a computing thread associated with the processor. The logic can also determine an average value for the plurality of state values, and determine whether to grant a frequency boost request based at least in part on the average value.

Other embodiments can involve a computer implemented method in which a plurality of state values are identified, wherein each state value corresponds to a computing thread associated with a processor. For one or more computing threads, identifying a state value may include sampling a thread performance state, conducting a comparison between the thread performance state and a performance state associated with a frequency boost request, and modifying a state counter corresponding to the computing thread based at least in part on the comparison. The method may provide for determining an average value for the plurality of state values, and granting a frequency boost request if the average value exceeds a threshold. The frequency boost request can be denied if the average value does not exceed the threshold.

Figure 1:
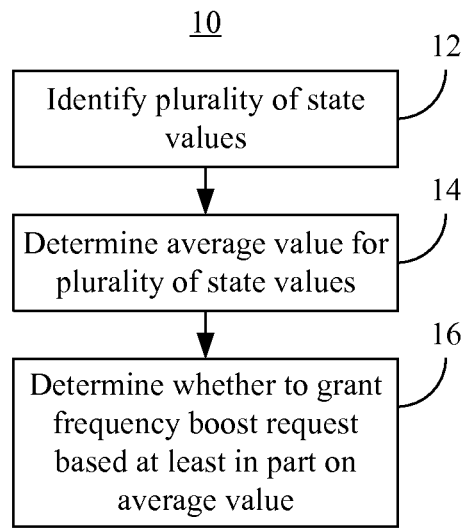
FIG. 1 is a flowchart of an example of a method of managing frequency boosts according to an embodiment.

Turning now to FIG. 1, a method 10 of managing frequency boosts is shown. The method 10 may be implemented in executable software as a set of logic instructions stored in a machine- or computer-readable medium of a memory such as, for example, random access memory (RAM), read only memory (ROM), programmable ROM (PROM), firmware, flash memory, etc., in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 10 may be written in any combination of one or more programming languages, including an object oriented programming language such as Java, Smalltalk, C++ or the like and conventional procedural programming languages, such as the "C" programming language or similar programming languages.

Processing block 12 provides for identifying a plurality of state values, wherein each state value corresponds to a computing thread (e.g., logical processor) associated with a multi-threaded physical processor. For example, the state values could represent processor performance state (e.g., Px) values and/or power state (e.g. Cx) values as defined in the Advanced Configuration and Power Interface Specification (e.g., ACPI Specification, Ref. 4.0a, Apr. 5, 2010), or other appropriate specification. Processor power states (Cx states) may define power consumption and thermal management conditions having specific entry and exit semantics, and performance states (Px states) may define power consumption and capability states within the active/executing states (e.g, C0 for processors). Thus, each active thread could be in a certain Cx/Px state, wherein illustrated block 12 identifies at least one state for each thread. Moreover, the processor could be a central processing unit (CPU) or a distributed computing architecture having a single- or multi-core configuration.

An average value may be determined for the plurality of state values at block 14, wherein illustrated block 16 determines whether to grant a frequency boost request based at least in part on the average value. As will be discussed in greater detail, the frequency boost request might be granted only if the average performance/power state value across all threads is above a certain threshold. Thus, in the case where there is a pending turbo boost request to increase the operating frequency of the processor to a level higher than the advertised maximum frequency for the processor, the illustrated example uses the average value to evaluate the multi-threaded processor load holistically as opposed to interpreting load on a per-thread basis. Simply put, the illustrated approach limits the ability of a single thread to dominate the frequency boost management scheme in a multi-threaded, multi-core environment. Accordingly, the method 10 can enable more efficient frequency boost operation.

Figure 2:
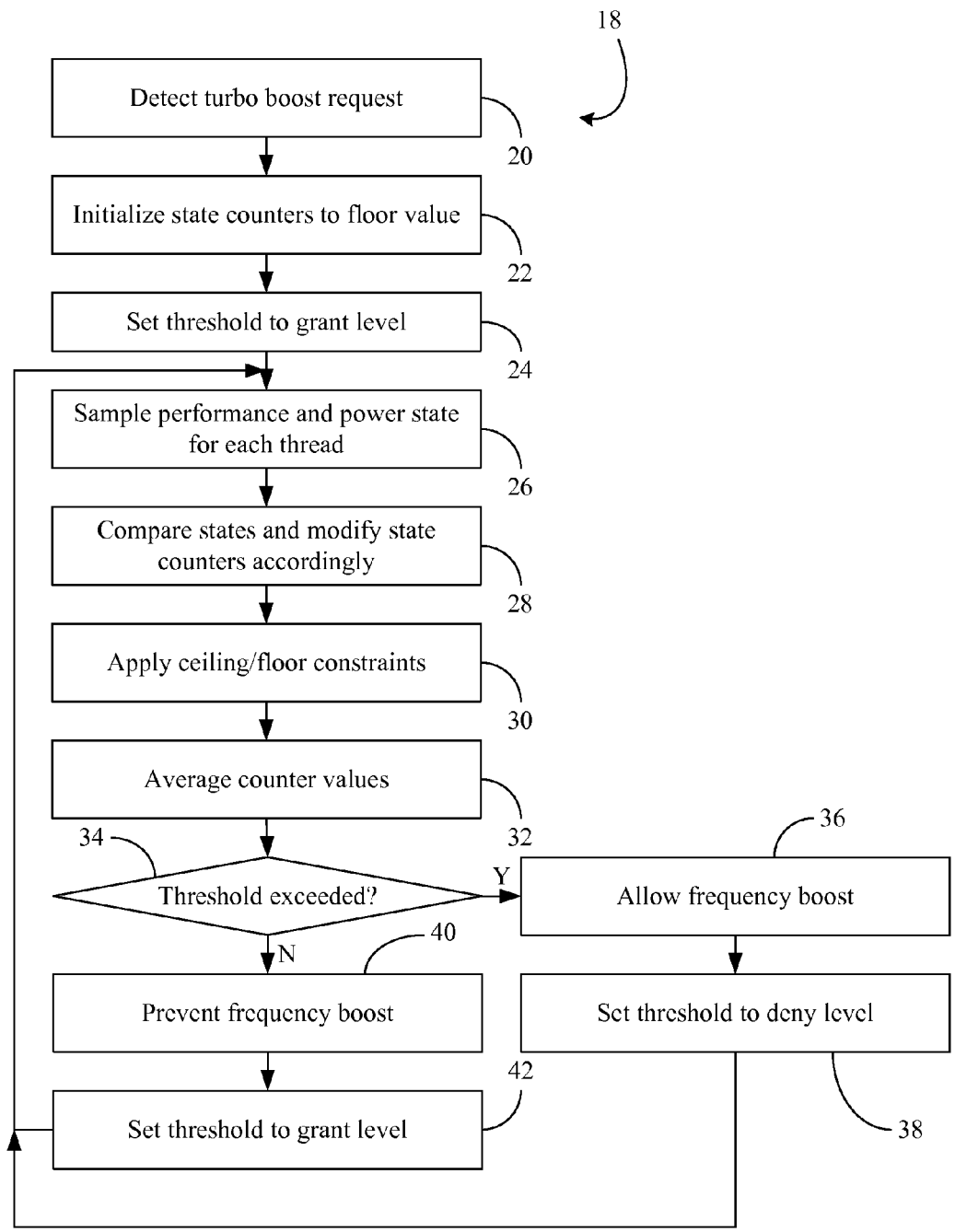
FIG. 2 is a flowchart of an example of a method of using ceiling/floor constraints and a hysteresis control function to manage frequency boosts according to an embodiment.

FIG. 2 shows a more detailed method 18 of managing frequency boosts in which ceiling/floor constraints and hysteresis control functionality are used to further enhance operation. In the illustrated example, it is determined at block 20 that one or more threads (e.g., logical processors) in a multi-threaded processing architecture is requesting turbo boost operation. In response to the request, block 22 initializes processor state counters corresponding to the active threads to a floor value. In particular, each computing thread may be associated with a counter that tracks its performance state as well as its power state, wherein the floor value could be a small non-zero value that prevents the state counters from taking on negative values that might be problematic for the averaging function.

A frequency boost threshold may be set to a "grant level" at block 24. As will be described in greater detail, multiple levels can be used for the threshold in order to implement a hysteresis control function for the frequency control system. Block 26 provides for sampling the performance and/or power state for each thread on a periodic basis. The sampling rate could be set at any appropriate value (e.g., every fifteen microseconds). Block 28 provides for conducting a comparison between the sampled states and a performance/power state associated with the frequency boost request, and modifying the state counters accordingly. For example, if a thread should be in the C0/P0 state in order to qualify for a frequency boost, the state of each thread would be compared against the C0/P0 state and its counter(s) would either incremented or decremented based on the comparison results. Moreover, the step value for the increment/decrement could be variable. Therefore, in the above example, a thread in the C0/Px state might have its state counter decremented by a certain amount and a thread in the Cx/Px state might have its state counter decremented a larger amount, whereas a thread in the C0/P0 state might have its state counter incremented by still another amount.

Illustrated block 30 applies ceiling/floor constraints to the counters. In particular, if a given state counter exceeds a ceiling value it may be set to (e.g., constrained to) the ceiling value, and if the state counter falls below the floor value it may be set to (e.g., constrained to) the floor value. As already noted, the floor value can prevent the state counters from taking on negative values that might be problematic for the averaging function. The ceiling value can limit the amount of history that is reflected in the averaging determination while still enabling a single thread to trigger a frequency boost. For example, the ceiling value for a twenty-thread processor architecture might be set to carry approximately twenty times the threshold value plus one in order to retain the amount of history that would be needed to make a frequency boost determination during single-threaded applications (e.g., scenarios when a single processor thread alone requests a frequency boost).

The counter values may be averaged at block 32, wherein a determination can be made at block 34 as to whether the average value exceeds a frequency boost threshold. If so, illustrated block 36 allows the frequency boost operation to proceed, and block 38 can set the threshold to a "deny level". Thus, if the threshold was previously at the grant level, block 38 might involve decreasing it to a lower level in order to make it slightly easier for the processor to remain in the frequency boost mode going forward. Accordingly, the illustrated approach implements a hysteresis control functionality that accounts for average values that might otherwise oscillate around the frequency boost threshold.

If the average value does not exceed the current frequency boost threshold, illustrated block 40 prevents the frequency boost operation from proceeding, and block 42 may set the threshold back to the grant level. Thus, if the threshold was previously reduced to the deny level, block 42 could involve increasing it to the higher level (e.g., once hysteresis has been accounted for). The frequency boost threshold may also be set to the grant level if it is determined that there are no longer any frequency boost requests pending.

Figure 3:
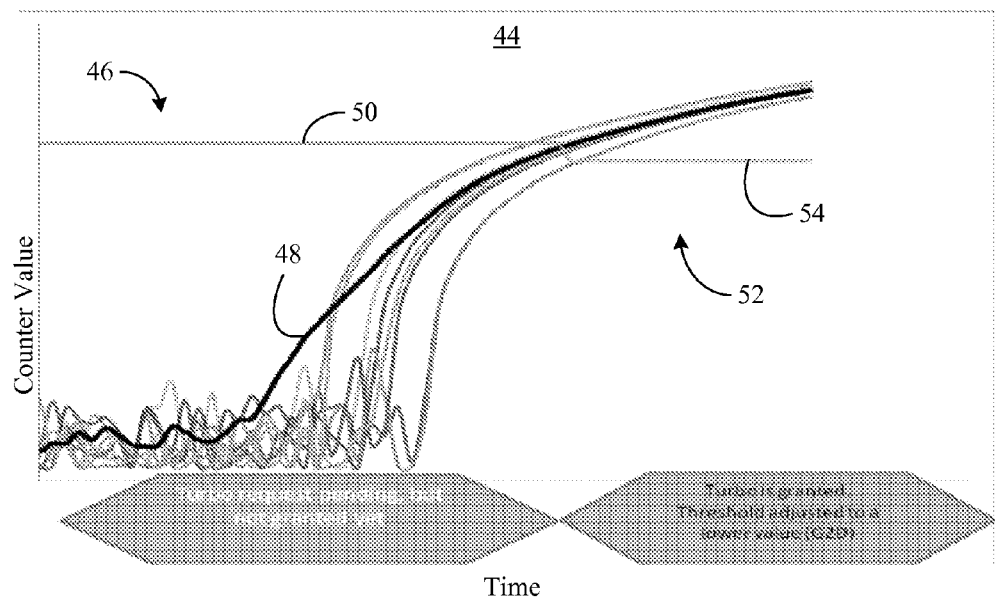
FIG. 3 is a plot of an example of a plurality of state counter values according to an embodiment.

Turning now to FIG. 3, a plot 44 is shown of eight state counter values and an average counter value over time. In the illustrated example, a first region 46 of the plot 44 reflects that an average value curve 48 is below a grant level 50 of a frequency boost threshold. Accordingly, although one or more frequency boost requests may be pending, none have been granted, in the example shown. A second region 52 of the plot 44, on the other hand, demonstrates that the average value curve 48 has exceeded the grant level 50 of the frequency boost threshold, which causes the frequency boost operation to be granted and the frequency boost threshold to be decreased to a lower deny level 54 (e.g., grant-to-deny/G2D), in the example shown.

Figure 4:
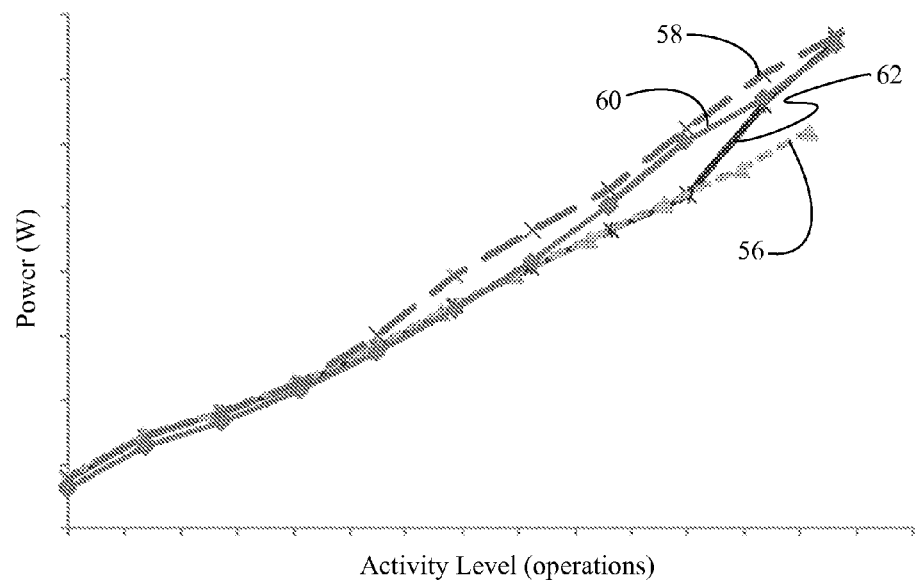
FIG. 4 is a plot of an example of a set of activity level versus power relationship curves according to an embodiment.

FIG. 4 shows a set of activity level versus power relationship curves for various modes of operation. In general, the illustrated plot shows the power consumption for a system at eleven performance intervals ranging from zero to the one hundred percent activity level (e.g., load). More particularly, a "power saver" curve 56 reflects a mode of operation in which frequency boosts are disabled, whereas a "performance" curve 58 reflects a mode of operation in which frequency boost requests are automatically granted. Thus, the performance curve 58 and the power saver curve 56 may constitute the upper and lower bounds, respectively, with regard to power consumption and performance. The illustrated plot also includes an "average-free" curve 60 that reflects a balanced mode of operation in which frequency boost requests are granted if any thread satisfies the frequency boost requirements (e.g., without averaging across threads), and an "average-based" curve 62 that reflects a balanced mode of operation in which frequency boost requests are granted if an average state value exceeds a threshold, as already discussed.

In the illustrated example, the performance curve 58 departs from the power saver curve 56 at the 40% activity level and the average-free curve 60 departs from the power saver curve 56 at the 60% activity level. The average-based curve 62, on the other hand, does not depart from the power saver curve 56 until the 80% activity level, in the example shown. Thus, the average-based curve 62 may be associated with much less power consumption between 60% and 90% load in comparison to the average-free curve 60.

Figure 5:
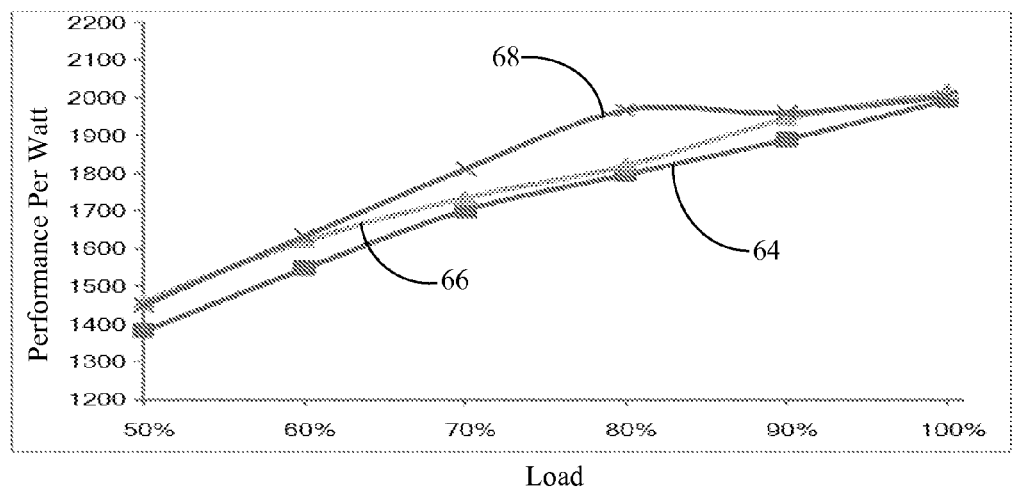
FIG. 5 is a plot of an example of a set of performance per watt curves according to an embodiment.

Turning now to FIG. 5, a plot of a set of performance per watt curves for various modes of operation is shown. In the illustrated example, a performance curve 64 reflects a mode of operation in which frequency boost requests are automatically granted and an average-free curve 66 reflects a balanced mode of operation in which frequency boost requests are granted if any thread satisfies the frequency boost requirements. Both the curves 64 and 66 exhibit less linearity than an average-based curve 68 that corresponds to a balanced mode of operation in which frequency boost requests are granted if an average state value exceeds a threshold, as already discussed. Simply put, the average-based curve 68 demonstrates that the approaches described herein can provide substantially more performance per watt for loads between 60% and 90% relative to conventional solutions.

Figure 6:
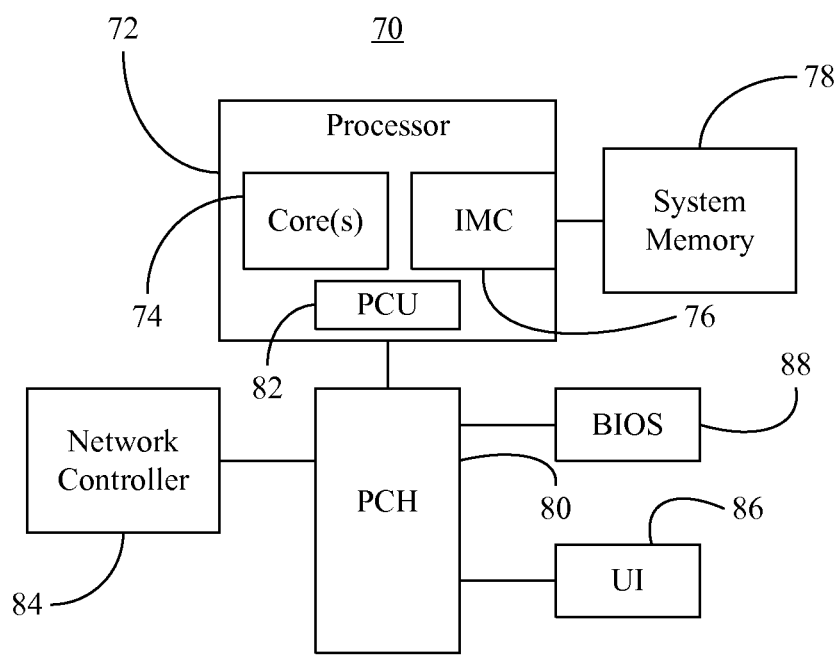
FIG. 6 is a block diagram of a system according to an embodiment.

FIG. 6 shows a platform 70 that could include a mobile device such as a laptop, personal digital assistant (PDA), mobile Internet device (MID), wireless smart phone, media player, imaging device, smart tablet, etc., or any combination thereof. The platform 70 could also include a fixed platform such as a desktop personal computer (PC) or a server. In the illustrated example, a processor 72 includes one or more cores 74 and an integrated memory controller (IMC) 76, which provides access to system memory 78. The memory controller could alternatively be located externally to the processor 72. The system memory 78 could include, for example, double data rate (DDR) synchronous dynamic random access memory (SDRAM, e.g., DDR3 SDRAM JEDEC Standard JESD79-3C, April 2008) modules, or other appropriate memory structure. The modules of the system memory 78 may be incorporated into, for example, a single inline memory module (SIMM), dual inline memory module (DIMM), small outline DIMM (SODIMM), and so on. The processor 72 may also have an advanced PCU (power control unit, e.g., "uncore") 82 that can manage on-die power via increasing or decreasing core voltage/frequency (P-state transitions) or power states (C-state transitions). In addition, the processor 72 could execute various software applications, drivers and/or operating systems (OS's) such as, for example, a Microsoft Windows, Linux, or Mac (Macintosh) OS.

The illustrated processor 72 communicates with a platform controller hub (PCH) 80, also known as a Southbridge, via a bus. The IMC 76/processor 72 and the PCH 80 are sometimes referred to as a chipset. The processor 72 may also be operatively connected to a network (not shown) through the PCH 80 and a network controller 84. Thus, the network controller 84 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The network controller 84 might also use a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification), digital subscriber line (DSL), cable modem, T1 connection), etc., to enable access to additional off-platform resources.

The illustrated PCH 80 is coupled to a user interface (UI, e.g., touch screen, liquid crystal display/LCD, light emitting diode/LED, etc.) 86, capable of enabling a user to interact with and perceive information from the platform 70. The PCH 80 may also have internal controllers such as a Serial ATA (SATA, e.g., SATA Rev. 3.0 Specification, May 27, 2009, SATA International Organization/SATA-IO) controller (not shown), a High Definition Audio controller (not shown), etc. The PCH 80 may also be coupled to storage, which can include BIOS (basic input/output system) memory 88, a hard drive, read only memory (ROM), optical disk, flash memory (not shown), etc.

The illustrated PCU 82 may be configured to identify a plurality of state values, wherein each state value is to correspond to a computing thread, determine a moving average value for the plurality of state values, and determine whether to grant one or more frequency boosts request based at least in part on the average value, as already discussed. The frequency boost requests might originate from an OS or other software component executing on the processor 72, wherein frequency boost operation might involve operating the processor 72 at a frequency higher than the advertised maximum operating frequency for the processor 72 (e.g., turbo boost operation).

In one example, the PCU 82 includes logic to sample thread performance states, conduct a comparison between the sampled thread performance states and a performance state associated with the frequency boost requests, and modify state counters corresponding to the computing threads based at least in part on the comparisons. Moreover, the logic of the PCU 82 could also take into consideration processor power states when determining whether to grant frequency boost requests.

The techniques described herein may therefore provide for monitoring multiple available threads in parallel, as well as computing a cumulative activity parameter that uses the optimal amount of history per thread. Accordingly, the impact of extremely active or extremely inactive threads may be tightly controlled in a complex computing environment. Moreover, frequency boosts can be dynamically restricted to certain load points to further enhance efficiency even during balanced mode operation. Additional efficiency benefits may be achieved through a unique hysteresis control mechanism that can prevent short-lived frequency boosts.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections.

In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
   identifying a plurality of state values, wherein each state value corresponds to a computing thread associated with a processor, and wherein, for one or more computing threads, identifying a state value includes,
   sampling a thread performance state on a periodic basis,
   conducting a comparison between the thread performance state and a performance state associated with a frequency boost request, and
   modifying a state counter corresponding to the computing thread based at least in part on the comparison;
   determining an average value for the plurality of state values;
   granting a frequency boost request if the average value exceeds a threshold; and
   denying the frequency boost request if the average value does not exceed the threshold.

2. The method of claim 1, further including decreasing the threshold from a first level to a second level if the frequency boost request is granted.

3. The method of claim 2, further including increasing the threshold from the second level to the first level if the frequency boost request is denied.

4. The method of claim 1, wherein modifying the state counter includes at least one of incrementing and decrementing the state counter by a variable step value.

5. The method of claim 4, wherein, for one or more computing threads, identifying a state value includes:
   sampling a thread power state;
   conducting an additional comparison between the thread power state and a power state associated with the frequency boost request; and
   modifying the state counter based at least in part on the additional comparison.

6. The method of claim 4, further including:
   setting the state counter to a ceiling value if the state counter exceeds the ceiling value; and
   setting the state counter to a floor value if the state counter falls below the floor value.

7. A computer readable storage medium comprising a set of instructions which, if executed by a processor, cause a computer to:
   identify a plurality of state values, wherein each state value is to correspond to a computing thread;
   determine an average value for the plurality of state values;
   determine whether to grant a frequency boost request based at least in part on the average value;
   grant the frequency boost request if the average value exceeds a threshold; and
   deny the frequency boost request if the average value does not exceed the threshold.

8. The medium of claim 7, wherein the instructions, if executed, cause a computer to decrease the threshold from a first level to a second level if the frequency boost request is granted.

9. The medium of claim 8, wherein the instructions, if executed, cause a computer to increase the threshold from the second level to the first level if the frequency boost request is denied.

10. A computer readable storage medium comprising a set of instructions which, if executed by a processor, cause a computer to:
    identify a plurality of state values, wherein each state value is to correspond to a computing thread;
    determine an average value for the plurality of state values; and
    determine whether to grant a frequency boost request based at least in part on the average value;
    wherein, for one or more computing threads, the instructions, if executed, cause a computer to:
    sample a thread performance state on a periodic basis;
    conduct a comparison between the thread performance state and a performance state associated with the frequency boost request; and
    modify a state counter corresponding to the computing thread based at least in part on the comparison.

11. The medium of claim 10, wherein the instructions, if executed, cause a computer to at least one of increment and decrement the state counter by a variable step value.

12. The medium of claim 10, wherein, for one or more computing threads, the instructions, if executed, cause a computer to:
    sample a thread power state;
    conduct an additional comparison between the thread power state and a power state associated with the frequency boost request; and
    modify the state counter based at least in part on the additional comparison.

13. The medium of claim 12, wherein the instructions, if executed, cause a computer to:
    set the state counter to a ceiling value if the state counter exceeds the ceiling value; and
    set the state counter to a floor value if the state counter falls below the floor value.

14. A computer implemented method comprising:
    identifying a plurality of state values, wherein each state value corresponds to a computing thread associated with a processor;
    determining an average value for the plurality of state values;
    determining whether to grant a frequency boost request based at least in part on the average value;
    granting the frequency boost request if the average value exceeds a threshold; and
    denying the frequency boost request if the average value does not exceed the threshold.

15. The method of claim 14, further including decreasing the threshold from a first level to a second level if the frequency boost request is granted.

16. The method of claim 15, further including increasing the threshold from the second level to the first level if the frequency boost request is denied.

17. A computer implemented method comprising:
    identifying a plurality of state values, wherein each state value corresponds to a computing thread associated with a processor;
    determining an average value for the plurality of state values; and determining whether to grant a frequency boost request based at least in part on the average value;
wherein, for one or more computing threads, identifying state value includes:
sampling a thread performance state on a periodic basis;
conducting a comparison between the thread performance state and a performance state associated with the frequency boost request; and
modifying a state counter corresponding to the computing thread based at least in part on the comparison.

18. The method of claim 17, wherein modifying the state counter includes at least one of incrementing and decrementing the state counter by a variable step value.

19. The method of claim 17, wherein, for one or more computing threads, identifying a state value includes:
sampling a thread power state;
conducting an additional comparison between the thread power state and a power state associated with the frequency boost request; and
modifying the state counter based at least in part on the additional comparison.

20. The method of claim 19, further including:
setting the state counter to a ceiling value if the state counter exceeds the ceiling value; and
setting the state counter to a floor value if the state counter falls below the floor value.

21. A system comprising:
a processor; and
logic to,
identify a plurality of state values, wherein each state value is to correspond to a computing thread associated with the processor,
determine an average value for the plurality of state values,
determine whether to grant a frequency boost request based at least in part on the average value,
grant the frequency boost request if the average value exceeds a threshold, and
deny the frequency boost request if the average value does not exceed the threshold.

22. The system of claim 21, wherein the logic is to decrease the threshold from a first level to a second level if the frequency boost request is granted.

23. The system of claim 22, wherein the logic is to increase the threshold from the second level to the first level if the frequency boost request is denied.

24. A system comprising:
a processor; and
logic to,
identify a plurality of state values, wherein each state value is to correspond to a computing thread associated with the processor,
determine an average value for the plurality of state values, and
determine whether to grant a frequency boost request based at least in part on the average value;
wherein, for one or more computing threads, the logic is to:
sample a thread performance state on a periodic basis,
conduct a comparison between the thread performance state and a performance state associated with the frequency boost request, and
modify a state counter corresponding to the computing thread based at least in part on the comparison.

25. The system of claim 24, wherein the logic is to at least one of increment and decrement the state counter by a variable step value.

26. The system of claim 24, wherein, for one or more computing threads, the logic is to,
sample a thread power state,
conduct an additional comparison between the thread power state and a power state associated with the frequency boost request, and
modify the state counter based at least in part on the additional comparison.

27. The system of claim 26, wherein the logic is to,
set the state counter to a ceiling value if the average value exceeds the ceiling value, and
set the state counter to a floor value if the average value falls below the floor value.

* * * * *